No. 891,996. PATENTED JUNE 30, 1908.
H. A. IVES & D. W. JEFFERY.
SAFETY DEVICE FOR BROOCHES AND THE LIKE.
APPLICATION FILED MAR. 5, 1907.
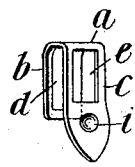
Fig. 1.
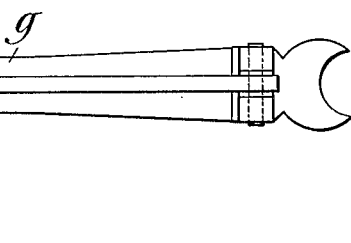
Fig. 3.
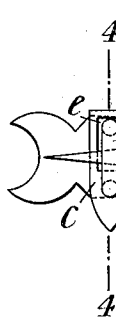
Fig. 2.
Fig. 4. — not matching; see below
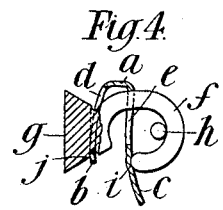
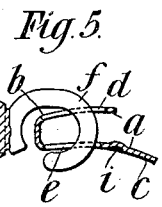
Fig. 6.
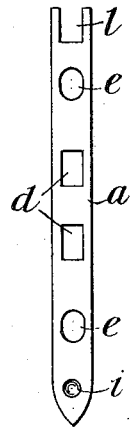
Fig. 7.
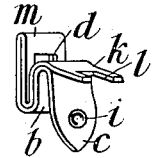
Fig. 9.
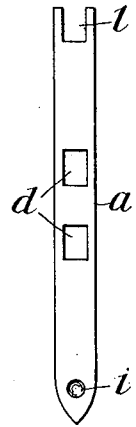
Fig. 10.
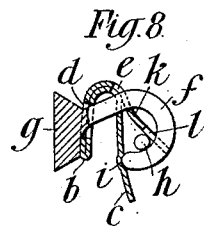
Fig. 8.
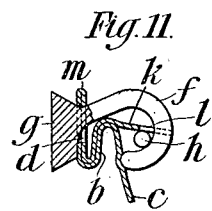
Fig. 11.
Witnesses:—
Mary E. Oiter
Eugene W. Bond
Inventors:—
H. A. Ives and D. W. Jeffery
by Arthur P. Browne
their Attorney

UNITED STATES PATENT OFFICE.

HERBERT AUGUSTUS IVES AND DENNIS WEBB JEFFERY, OF COLCHESTER, ENGLAND.

SAFETY DEVICE FOR BROOCHES AND THE LIKE.

No. 891,996.  Specification of Letters Patent.  Patented June 30, 1908.

Application filed March 5, 1907. Serial No. 360,669.

*To all whom it may concern:*

Be it known that we, HERBERT AUGUSTUS IVES and DENNIS WEBB JEFFERY, subjects of the King of Great Britain, residing at 118 High street, Colchester, in the county of Essex, England, and Kingdom of Great Britain, have invented new and useful Improvements in Safety Devices for Brooches and the Like, of which the following is a specification.

The invention relates to brooches and the like of the kind provided with a hinged or spring pin and hook designed to engage together when a brooch is in use and which have a spring arm extending across the hook into engagement with the nose thereof so as to inclose the said pin and prevent the accidental disengagement of the latter from the hook, such disengagement frequently occurring after the brooch or the like has been some time in use and often resulting in the loss of the latter.

The object of the invention is to construct the spring arms separate from the brooches and the like and in such a manner that they can be readily attached to the hooks of the brooches without the use of rivets, solder or other independent means of fastening.

According to the invention a strip of metal of a spring nature is employed, the ends of which are bent towards each other so as to render it of an approximately U-shape. Holes or slots are formed in each limb of the device so that it can be threaded on to the hook of the brooch, one limb engaging the base of the hook while the other limb, which forms the spring arm, extends across the hook and bears against the nose of the latter so as to inclose the space within the hook which space receives the pin of the brooch, an indentation being advantageously formed in the said limb to engage the said nose.

In some cases the device, in addition to the slots for engaging the hook of the brooch or the like, is formed with an additional limb bifurcated so as to embrace the outer part of the said hook and for this purpose the strip of spring metal is doubled upon itself before being bent to a U-shape, the free ends of the strip forming the outer limb being caused to diverge, the inner portion thereof extending across the hook and bearing against the nose of the latter, while the outer portion forms the additional bifurcated limb as above described.

In order that the invention can be clearly understood, reference is had to the annexed drawing, in which, Figure 1 is a perspective view of one form of the improved spring arm device. Fig. 2 is a view of the device before being bent to a U-shape. Fig. 3 is a rear view of a brooch with the device applied and Fig. 4 is a section on the line 4—4, Fig. 3. Fig. 5 is a view similar to Fig. 4 illustrating the method of engaging the device with the hook of the brooch. Figs. 6, 7 and 8 are views similar to Figs. 1, 2 and 4 respectively of a modified form of the spring arm device and Figs. 9, 10 and 11 are also views similar to Figs. 1, 2 and 4 respectively of a further modification. All the views are drawn to an enlarged scale.

Referring to Figs. 1 to 5, $a$ is the strip of spring metal and $b$, $c$ are the two limbs of the device when bent to a U-shape as shown clearly in Figs. 1, 4 and 5.

$d$ and $e$ are the holes or slots formed in the limbs $b$ and $c$, respectively, so that the device can be threaded on to the hook $f$ of the brooch $g$, the limb $b$ engaging the base of the said hook by means of the slot $d$ while the limb or spring arm $c$ extends across the hook, as shown clearly in Fig. 4, by means of the slot $e$ and bears against the nose of the said hook so as to inclose the space within the hook to receive the pin $h$ of the brooch.

$i$ is the indentation in the spring arm $c$ to engage the nose of the hook.

The spring arm $c$, while inclosing the space within the hook $f$ to maintain the pin $h$ against accidental disengagement from the said hook, can be forced back by the said pin when it is required to disengage the latter from the hook to remove the brooch from the clothing of the wearer.

The device is engaged with the hook $f$ by threading it on to the latter as indicated in Fig. 5, the bottom of the limb $b$, when the device is turned into position, engaging the recess $j$ between the hook and the body of the brooch, as shown in Fig. 4, and being maintained therein by the pressure of the limb $c$ against the nose of the hook. By pressing down the limb $b$ to disengage its lower end from the recess $j$ the device can be withdrawn from the hook $f$.

In practice it is found that so long as the base of the hook is of such a form as to lie against the back of the brooch, for instance, as illustrated in Fig. 4, it practically fills the slot $d$ and secures the spring arm against any turning movement relatively with the hook.

In some brooches, however, the bases of the hooks stand out almost perpendicular to the backs of the brooches so that the spring arms can turn upon the hooks. To obviate this drawback, the construction of spring arm device illustrated in Figs. 6 to 8 or 9 to 11 is employed.

In the arrangement illustrated in Figs. 6, 7 and 8, the strip $a$ is made longer than that described with reference to Figs. 1 to 5 and is doubled upon itself as shown clearly in Figs. 7 and 8 before being bent to a U-shape. Four slots are formed in the strip so that when the latter is doubled they will coincide to form the slots $d$ and $e$. The inner limb $b$ formed by the folded end of the strip $a$ embraces the base of the hook by means of the slot $d$ while the free ends of the strip, forming the outer limb, are caused to diverge, the inner portion forming the spring arm $c$ extending across the hook $f$ and bearing against the nose of the said hook and the outer portion, forming an additional limb $k$, is bifurcated as at $l$, and engages the outer portion of the hook $f$.

In the construction illustrated in Figs. 9 to 11 the slot $e$ is dispensed with and the inner limb $b$ is made longer than that described with reference to the arrangement illustrated in Figs. 6 to 8 and is bent back upon itself, the folded back portion $m$ containing the slot $d$ to engage the base of the hook $f$, the free ends of the strip forming the outer limb being located below the stem of the hook $f$ instead of passing above it as in the arrangements hereinbefore described.

In the arrangements illustrated in Figs. 6 to 11 the device can be removed from the hook $f$ by pressing down the limb $k$ until it and the arm $c$ are free of the nose of the hook $f$ when the device can be turned half-round upon the shank of the hook and then withdrawn therefrom.

We claim:—

1. A brooch or like article having, in combination, a hook, and a guard apertured to be slipped over the hook and to be supported on the brooch without other means of attachment, said guard having an elastic arm bearing against the point of the hook.

2. A brooch or like article having, in combination, a hook and a guard having two separated limbs each apertured to slip over the hook, whereby the guard is supported on the hook without other means of attachment, and said guard having an elastic arm bearing against the point of the hook.

3. In a brooch or the like of the kind hereinbefore described the combination with the hook thereof of a spring arm inclosing the space within the said hook and formed by a strip of spring metal of approximately U-shape, provided with holes and with a bifurcated limb to engage the hook, substantially as described.

4. In a brooch or the like of the kind hereinbefore described, the combination with the hook thereof of a spring arm inclosing the space within the said hook and formed by a strip of spring metal doubled upon itself, and bent to an approximately U-shape, the said strip being provided with holes to engage the hook and one of the free ends of the strip serving as the spring arm while the other free end is bifurcated to engage the said hook, substantially as described.

5. In a brooch or the like of the kind hereinbefore described, the combination with the hook thereof of a spring arm inclosing the space within the said hook and formed by a strip of spring metal doubled upon itself and bent to an approximately U-shape with one of its limbs turned back upon itself and slotted to engage the base of the hook, one of the free ends of the strip serving as the spring arm while the other free end is bifurcated to engage the said hook, substantially as described.

In testimony whereof we affix our signatures in presence of two witnesses.

HERBERT AUGUSTUS IVES.
DENNIS WEBB JEFFERY.

Witnesses:
  H. D. JAMESON,
  A. NUTTING.